(12) United States Patent
Guan et al.

(10) Patent No.: US 12,347,416 B2
(45) Date of Patent: Jul. 1, 2025

(54) SYSTEMS AND METHODS TO AUTOMATE TRUST DELIVERY

(71) Applicant: Accenture Global Solutions Limited, Dublin (IE)

(72) Inventors: Lan Guan, New York, NY (US); Neeraj D Vadhan, Los Altos, CA (US); Sukryool Kang, Dublin, CA (US); Anwitha Paruchuri, San Jose, CA (US); Anupam Anurag Tripathi, Chicago, IL (US); Sujeong Cha, Long Island City, NY (US); Thomas Wayne Hancock, Oklahoma City, OK (US); Jill Gengelbach-Wylie, Austin, TX (US); Yuan He, San Jose, CA (US); Andrew Francis Hickl, Sammamish, WA (US); Ivan Wong, Edison, NJ (US); Surya Raghavendra Vadlamani, Newtown, PA (US)

(73) Assignee: Accenture Global Solutions Limited, Dublin (IE)

( * ) Notice: Subject to any disclaimer, the term of this patent is extended or adjusted under 35 U.S.C. 154(b) by 325 days.

(21) Appl. No.: 18/074,757

(22) Filed: Dec. 5, 2022

(65) Prior Publication Data
US 2024/0185832 A1    Jun. 6, 2024

(51) Int. Cl.
*G10L 13/047*        (2013.01)
*G06T 13/20*         (2011.01)
(Continued)

(52) U.S. Cl.
CPC .......... *G10L 13/047* (2013.01); *G06T 13/205* (2013.01); *G06T 13/40* (2013.01);
(Continued)

(58) Field of Classification Search
CPC ....... G10L 13/047; G10L 15/16; G10L 25/57; G10L 25/63; G10L 25/30; G06T 13/205; G06T 13/40; G06T 17/20
See application file for complete search history.

(56) References Cited

U.S. PATENT DOCUMENTS

2019/0122651 A1*  4/2019  Arik ................. G10L 13/08
2019/0251952 A1*  8/2019  Arik ................. G10L 13/08
(Continued)

*Primary Examiner* — Abul K Azad
(74) *Attorney, Agent, or Firm* — Polsinelli PC

(57) ABSTRACT

The present disclosure relates to systems, methods, and products for using machine-learning networks to generate trustworthy audio and face mesh. A system, serving as a digital avatar, generates a trust audio and trust face mesh corresponding to an input text. A method includes generating a set of trust embedding vectors based on a reference audio; generate a text embedding vector based on the input text; generate a conditioned vector based on the set of trust embedding vectors and the text embedding vector; synthesize an audio representation based on the conditioned vector; generate the trust audio based on the synthesized audio representation; obtain a speech feature representation based on the trust audio; obtain an abstract feature vector based on the speech feature representation; and generate positions of vertices based on the abstract feature vector, the positions of vertices being used for generating the trust face mesh.

17 Claims, 13 Drawing Sheets

(51) Int. Cl.
*G06T 13/40* (2011.01)
*G06T 17/20* (2006.01)
*G10L 15/16* (2006.01)
*G10L 25/57* (2013.01)

(52) U.S. Cl.
CPC .............. *G06T 17/20* (2013.01); *G10L 15/16* (2013.01); *G10L 25/57* (2013.01)

(56) References Cited

U.S. PATENT DOCUMENTS

| | | | |
|---|---|---|---|
| 2021/0312906 A1* | 10/2021 | Kuo .................... | G10L 15/1822 |
| 2023/0111824 A1* | 4/2023 | Mukherjee ............... | G06N 3/08 |
| | | | 704/200 |
| 2024/0087558 A1* | 3/2024 | Oplustil Gallegos ... | G10L 13/08 |

* cited by examiner

400 generate a set of trust embedding vectors based on a reference audio by a first encoder of the machine-learning network
410 generate a text embedding vector based on the input text by a second encoder of the machine-learning network
420 generate a conditioned vector based on the set of trust embedding vectors and the text embedding vector by a trust conditioner of the machine-learning network
430 synthesize an audio representation based on the conditioned vector by an attention-based decoder of the machine-learning network
440 generate the trust audio based on the synthesized audio representation by a vocoder of the trained machine-learning network, the trust audio being a trustworthy sound representation of the input text
450

Figure 4A obtain a speech feature representation based on the trust audio by a first speech
analysis network of the video-generation network
460 obtain an abstract feature vector based on the speech feature representation by a
second speech analysis network of the video-generation network
470 generate positions of vertices based on the abstract feature vector by a vertex output
network of the video-generation network, the positions of vertices being used for
generating the trust face mesh
480

Figure 4B

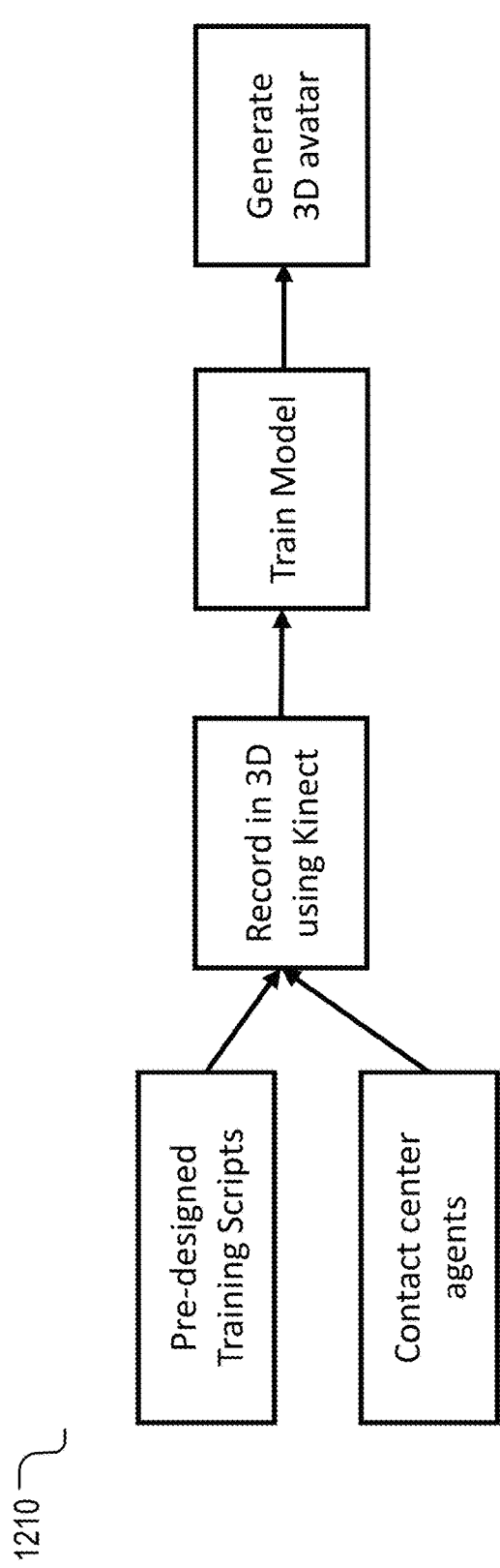
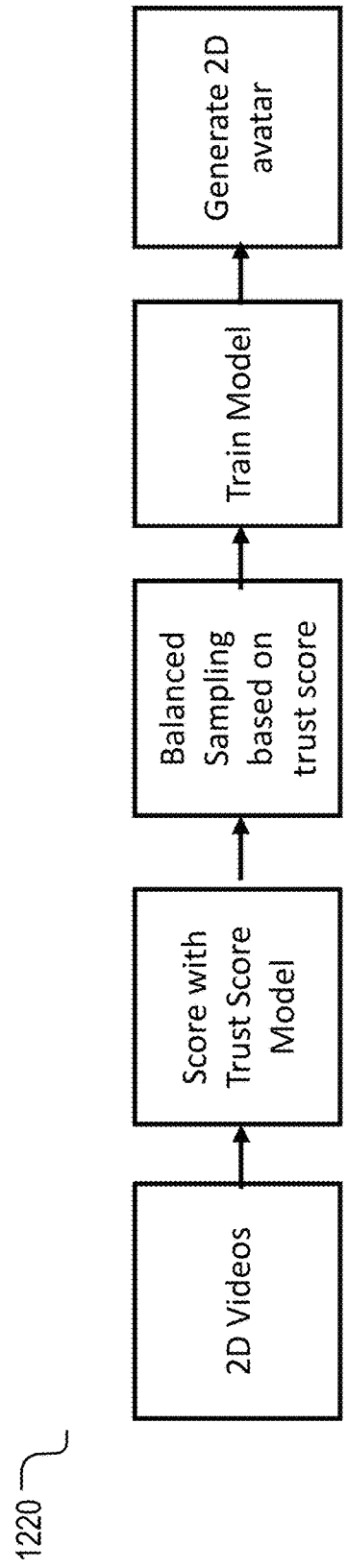
Figure 12A
Figure 12B

SYSTEMS AND METHODS TO AUTOMATE TRUST DELIVERY

TECHNICAL FIELD

This disclosure relates to machine learning and artificial intelligence (AI), and is particularly directed to systems and methods for automating trust delivery with machine learning models.

BACKGROUND

Trust is essential to build meaningful business and personal relationships, especially during a live conversation. A trustworthy conversation promotes customer satisfaction and business outcome for sales, marketing and service applications. However, trust is not straightforward to quantify previously because there is no well-established standard to perceive or measure this psychologic property present in interpersonal relationships. Therefore, trust assessment is largely based on subjective ratings and it's difficult to compare trust delivery among individuals/teams and track its improvement over time.

Over the past decade, machine learning/artificial intelligence (AI) has evolved at a very noticeable pace. Machine learning is dependent on building complex machine models and/or system. The machine learning models, including deep learning models, may be based on machine learning algorithms, and may include a plurality of hyper-parameters for the machine learning architecture, the machine learning training, and machine learning evaluation.

SUMMARY

The present disclosure describes various embodiments of systems, methods, and/or products using machine learning models to automate trust delivery with new artificial intelligence and behavior sciences techniques. An objective, reproducible, and automated system/method for generating a realistic and trustworthy digital avatar trained with high trust standard is disclosed, which advances the technology or technical fields of machine learning and/or artificial intelligence.

The present disclosure describes a system including a non-transitory memory storing instructions executable to construct a machine-learning network to generate a trust audio corresponding to an input text; and a processor circuitry in communication with the non-transitory memory. The processor circuitry executes the instructions to cause the system to: generate a set of trust embedding vectors based on a reference audio by a first encoder of the machine-learning network; generate a text embedding vector based on the input text by a second encoder of the machine-learning network; generate a conditioned vector based on the set of trust embedding vectors and the text embedding vector by a trust conditioner of the machine-learning network; synthesize an audio representation based on the conditioned vector by an attention-based decoder of the machine-learning network; and generate the trust audio based on the synthesized audio representation by a vocoder of the machine-learning network, the trust audio being a trustworthy sound representation of the input text.

The present disclosure also describes a method including generating, by a computer device, a set of trust embedding vectors based on a reference audio by a first encoder of a machine-learning network; generating, by the computer device, a text embedding vector based on an input text by a second encoder of the machine-learning network; generating, by the computer device, a conditioned vector based on the set of trust embedding vectors and the text embedding vector by a trust conditioner of the machine-learning network; synthesizing, by the computer device, an audio representation based on the conditioned vector by an attention-based decoder of the machine-learning network; and generating, by the computer device, the trust audio based on the synthesized audio representation by a vocoder of the machine-learning network, the trust audio being a trustworthy sound representation of the input text.

The present disclosure further describes a product including machine-readable media other than a transitory signal; instructions stored on the machine-readable media for constructing a machine-learning network to generate a trust audio corresponding to an input text. When a processor circuitry executes the instructions, the product is configured to: generate a set of trust embedding vectors based on a reference audio by a first encoder of the machine-learning network; generate a text embedding vector based on the input text by a second encoder of the machine-learning network; generate a conditioned vector based on the set of trust embedding vectors and the text embedding vector by a trust conditioner of the machine-learning network; synthesize an audio representation based on the conditioned vector by an attention-based decoder of the machine-learning network; and generate the trust audio based on the synthesized audio representation by a vocoder of the machine-learning network, the trust audio being a trustworthy sound representation of the input text.

The present disclosure also describes a system including circuitry configured to implement any of the above methods.

The present disclosure also describes a non-transitory computer-readable storage medium storing computer-readable instructions. The computer-readable instructions, when executed by a processor circuitry, are configured to cause the processor circuitry to perform any of the above systems and methods.

BRIEF DESCRIPTION OF THE DRAWINGS

FIG. 4A shows a flow diagram of an exemplary method.

FIG. 4B shows a flow diagram of another exemplary method.

FIG. 12A shows a schematic diagram of an exemplary embodiment of the present disclosure.

FIG. 12B shows a schematic diagram of another exemplary embodiment of the present disclosure.

DETAILED DESCRIPTION

Figure 1:
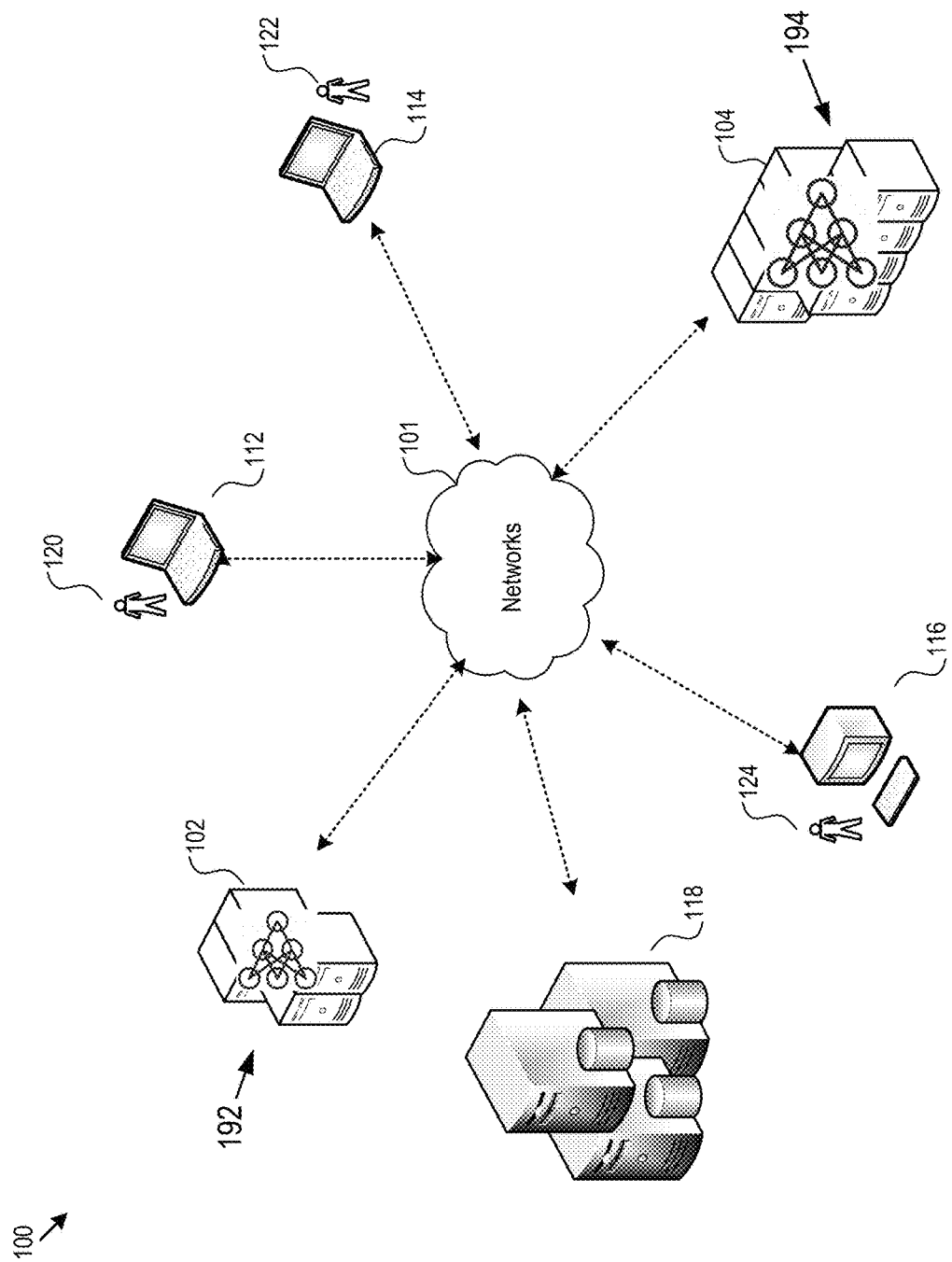
FIG. 1 shows an exemplary electronic communication environment for implementing a machine-learning network for generating trustworthy voice and face mesh.

The disclosure will now be described hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments set forth herein. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Trust is essential to build meaningful business and personal relationships, especially during a live conversation. A trustworthy conversation promotes customer satisfaction and business outcome for sales, marketing and service applications. In today's business world, customers take good service with a certain trust for granted. However, trust is not straightforward to quantify previously for multiple reasons. One of the reasons may be that there is no standard to perceive or measure this psychologic property present in interpersonal relationships. Therefore, trust assessment is largely based on subjective ratings and it's difficult to compare trust delivery among individuals/teams and track its improvement over time. For example, customer service call success data indicates that standardizing agent performance may be an important factor for strengthening customer trust; and/or social media may have different level and progression of customer satisfaction and there may be room for improvement.

The present disclosure describes various embodiments of systems and methods to quantify and improve trust in conversations between more than one participants using artificial intelligence, machine-learning network, and/or behavior sciences techniques. In various embodiments, textual and/or audio data may be used as input for trust quantification. Various embodiments in the present disclosure may be extendable to visual input when video data is available. Some embodiments include methods and systems for replacing one participant by a digital avatar, delivering trustworthy audio and/or video in conversations. Various embodiments in the present disclosure may provide objective, reproducible, and/or automated methods for trust management in conversations. Not limited to trust, various embodiments in the present disclosure may be applied to quantify and manage any psychologic factors related to human perception, including fairness, safety, stress, interest, and the like.

There may be some issues/problems with replacing human agents with with digital avatars. For example, in some implementations, the speech synthesis and face mesh generation of some avatars may only focus on exact delivery of contents without substantive consideration of its trustworthiness, and/or there is lack of enriching synthesized speech and generated face mesh with trustworthy voices and facial expressions.

The present disclosure describes various embodiment, addressing at least one of the issues/problems discussed, understanding the characteristics of trustworthy conversations, quantifying trust perception, and/or improving trust delivery in conversation. Trust embeddings (i.e., vector entities) may preserve characteristics of trustworthy conversations, and may act as conditions during speech synthesis and face mesh generation processes. Various embodiments in the present disclosure provide unique and novel way(s) to construct a trustworthy digital avatar.

The systems in various embodiments may include one, more, or all of the following components. A measurement component may obtain questionnaire-based rating of trust perception using behavior science based on raw input (e.g., voice data of conversations). A score component may perform machine learning-based scoring of trust delivery using, for example, textual and voice features obtained from the raw input. A score component may perform deep learning-based scoring (e.g., with deep learning models) of trust delivery directly based on the raw input. A recommendation component may provide personalized coaching using AI-based training recommendations. An automation component may include a realistic digital avatar trained with high trust standard. More detailed description is included in U.S. application Ser. No. 17/732,944 filed on Apr. 29, 2022, which is incorporated herein by reference in its entirety; and more detailed description is included in U.S. application Ser. No. 17/826,515 filed on May 27, 2022, which is incorporated herein by reference in its entirety.

Various embodiments in the present disclosure may generate a trust audio and/or a trust face mesh corresponding an input text. In some implementations, some embodiments in the present disclosure may be integrated with the internal and/or external third-party call center solutions to create true customer experience with AI powered real-time trust score, may execute customer segmentation by trust Score and segment profiling, may personalize customer strategy, and/or may target trust scores by industry to provide tailored solutions.

In some implementations, some embodiments in the present disclosure may be applied in healthcare industry screening by conducting pre-screening depression tests for youth emotion and health check using AI trust score, designing and enhancing the trust score to execute the pre-screening program based on age group and gender with subject matter expert (SME) inputs, and/or tracking and measuring the result to iteratively improve the trust score.

In some implementations, some embodiments in the present disclosure may be integrated with a conversation AI platform (CAIP) by planning personalized campaign(s) based on segmentation result and customer trust score, providing existing campaign analytics, measuring the benefits through A/B test for trust score, and/or using trust score for real time interaction adjustment.

In some implementations, some embodiments in the present disclosure may add real time measurement to customer experience modules, providing real-time lens of customer experience with an AI powered real-time gauge of a determined trust score, and providing real time enhancement in areas of agent empowerment and improvement: for example, agent assistant, training recommendation, and/or real time client conversation gauge and feedback.

In some implementations, some embodiments in the present disclosure may be applied to applicant recruiting solution by calibrating trust score with recruiting objectives, providing recruiters with real-time prompts to improve the quality of interaction, and/or increasing likelihood of a successful recruiting process.

In some implementations, some embodiments in the present disclosure may be applied to avatar integration by building trust score metrics into avatar messaging. An avatar may communicate the message content through trust score nuanced conversational and facial features.

FIG. 1 shows an exemplary electronic communication environment 100 in which a digital avatar, a trust quantification and management system, or any other system described in the present disclosure may be implemented. The electronic communication environment 100 may include one or more servers (102 and 104) including one or more machine-learning network and/or deep-learning network (e.g., 192 and/or 194), one or more user devices (112, 114, and 116) associated with users (120, 122, and 124), and one or more databases 118, in communication with each other via public or private communication networks 101.

The server 102 may be implemented as a central server or a plurality of servers distributed in the communication networks. While the server 102 shown in FIG. 1 is implemented as a single server, the server 102 may be implemented as a group of distributed servers, or may be distributed on the server 104.

The user devices 112, 114, and 116 may be any form of mobile or non-mobile electronic devices including but not limited to desktop personal computer, laptop computers, tablets, mobile phones, personal digital assistants, and the like. The user devices 112, 114, and 116 may be installed with a user interface for accessing the digital avatar, the trust quantification and management system or any other system described in the present disclosure. The one or more database 118 of FIG. 1 may be hosted in a central database server, a plurality of distributed database servers, or in cloud-based database hosts. The database 118 may be organized and implemented in any form, including but not limited to relational database containing audio data, text data, graphic data, video data, or the like. The database 118 may be configured to store the intermediate data and/or final results for implementing the digital avatar and trust quantification and management system.

Figure 2:
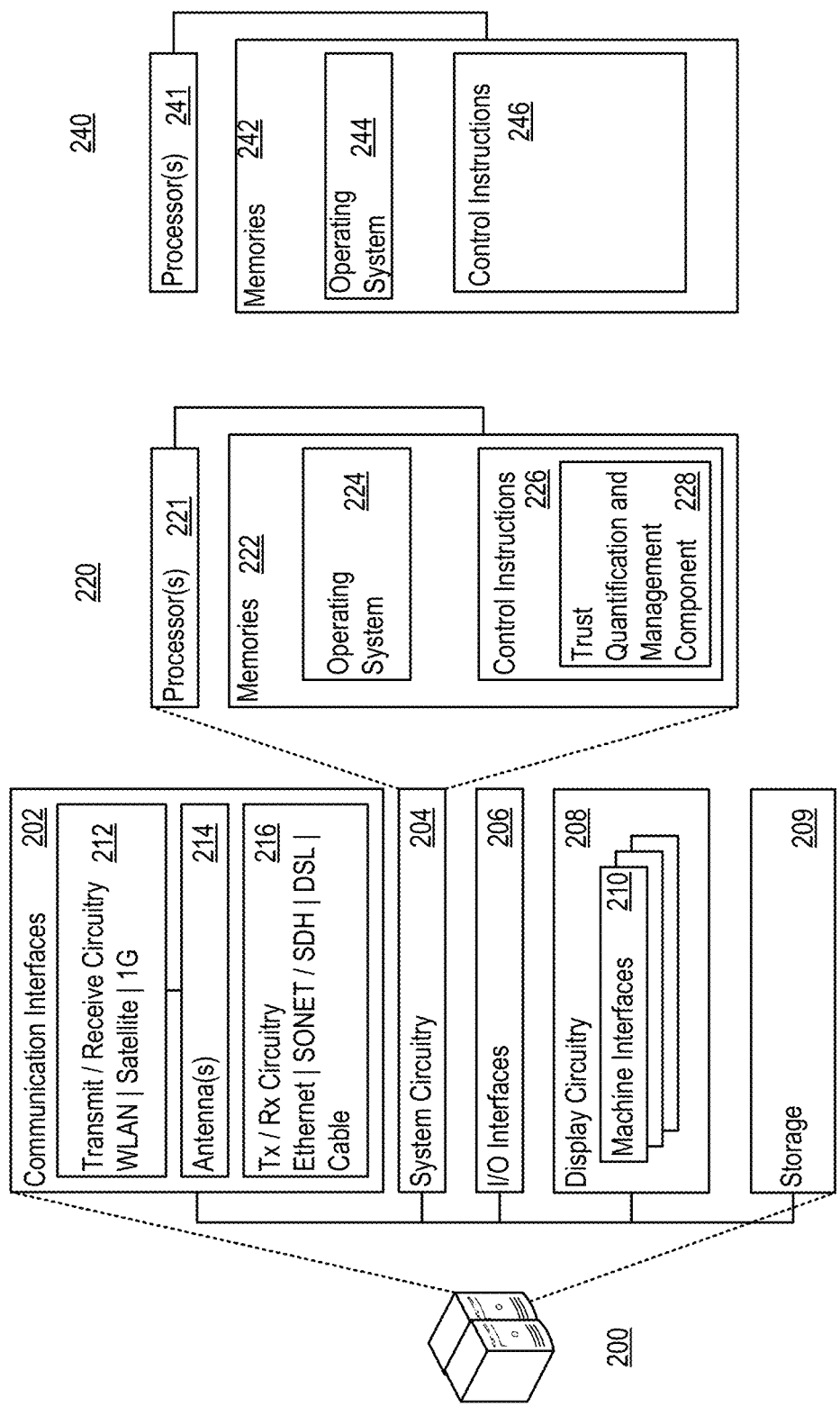
FIG. 2 shows computer systems that may be used to implement various components of the electronic communication environment of FIG. 1.

FIG. 2 shows an exemplary system, which is a computer system 200 for implementing the server 102 or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), synchronous optical network (SONET), or other protocol.

The storage 209 may be used to store various initial, intermediate, or final data or model for implementing the digital avatar and trust quantification and management system. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, at least some of the system circuitry 204 may be implemented as processing circuitry 220 for the server 102 of FIG. 1. The processing circuitry 220 may include one or more processor circuitry 221 and memories 222. The memories 222 stores, for example, control instructions 226 and an operating system 224. The control instructions 226, for example may include instructions for implementing the components 228 of a trust quantification and management system. In one implementation, the processor circuitry 221 executes the control instructions 226 and the operating system 224 to carry out any desired functionality related to the ditital avatar and the trust quantification and management.

Alternatively, or in addition, at least some of the system circuitry 204 may be implemented as client circuitry 240 for the user devices 112, 114, and 116 of FIG. 1. The client circuitry 240 of the user devices may include one or more instruction processor circuitry 241 and memories 242. The memories 242 stores, for example, control instructions 246 and an operating system 244. In one implementation, the instruction processor circuitry 241 execute the control instructions 246 and the operating system 244 to carry out any desired functionality related to the user devices.

Figure 3A:
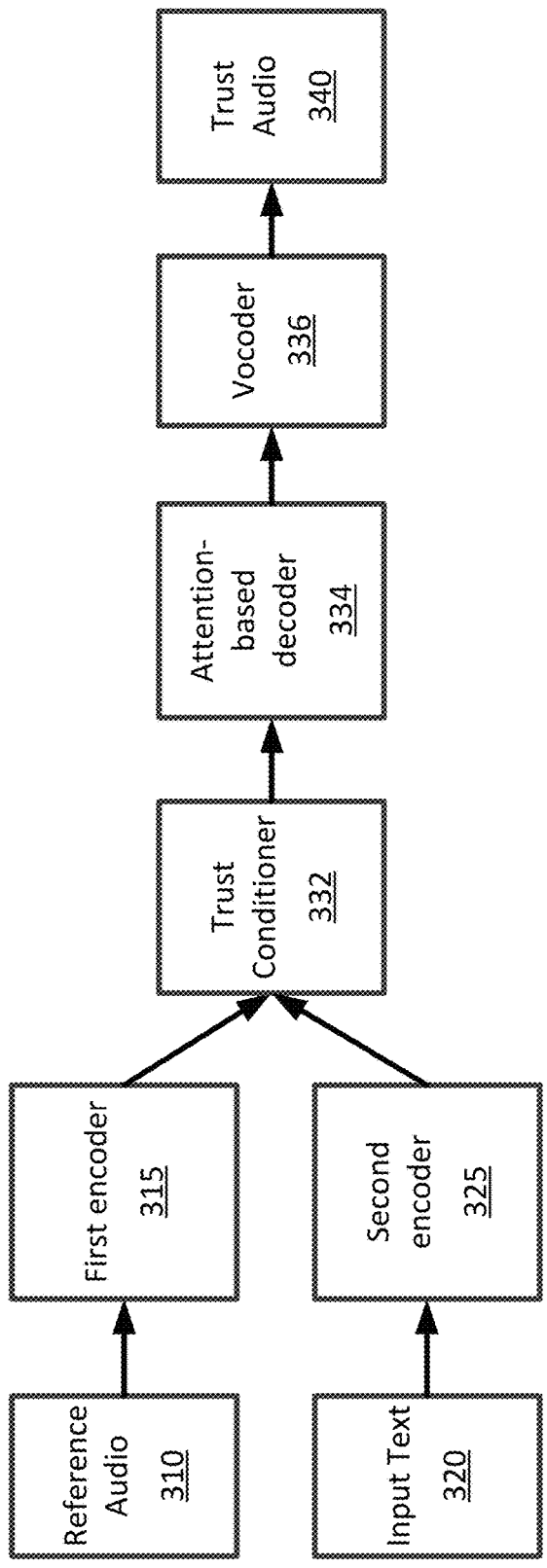
FIG. 3A shows a schematic diagram of an embodiment of the present disclosure.

FIG. 3A shows an example of a machine-learning network 300 to generate a trust audio 340 according to an input text 320 based on a reference audio 310. The reference audio has a trustworthy tone. The machine-learning network 300 may include a portion or all of the following: the reference audio 310, a first encoder 315, the input text 320, a second encoder 325, a trust conditioner 332, an attention-based decoder 334, a vocoder 336, and/or the trust audio 340.

In some implementations, the reference audio 310 may include an audio in waveform or an audio in spectrogram (e.g., mel spectrogram) format. The reference audio may be obtained based on its trustworthy tone, which may act as a condition for synthesizing the trust audio corresponding to the input text.

In some implementations, the first encoder may output trust embeddings (e.g., a set of trust embedding vectors) based on the reference audio as input. The first encoder may include an audio encoder, and a trust encoder. The audio encoder may output reference embeddings as a set of fixed-length vectors based on the reference audio. The trust encoder may include a trust based global style token (T-GST) layer. In some implementations, the T-GST layer may output a set of trust embedding vectors. In some implementations, the set of trust embedding vectors may be referred/combined as a single embedding vector, which has a larger dimension than each of the set of trust embedding vectors.

In some implementations, the input text may include a section of conversation script, or a continuous flow of script of an on-going dialogue. The input text may be obtained from another machine-learning network, which may generate the input text based on an audio, a video, a script, or the like. For one non-limiting example, the input text may come from a rule-based system, pulling a sentence from a database that matches up with the main keywords in customer's comments. For another non-limiting examples, in a more advanced system, the input text may come from a Dialogue Management System (DMS) that detects the intention of the customer's comments and choose an action (formulate a message) based on it.

In some implementations, the second encoder may generate a continuous vector based on the input text. The second encoder may be referred as the text encoder. For example, the second encoder may represent each character in the input text as a one-hot vector, and embed them into a continuous vector.

In some implementations, the trust conditioner may condition the vector output from the second encoder according to the trust embeddings output from the first encoder. As a non-limiting example, the trust conditioner may generate a conditioned embeddings in the form of, for example, a conditioned vector, by combining the vector and the trust embeddings (e.g., concatenating the vector with the trust embeddings).

In some implementations, the attention-based decoder may generate a synthesized audio representation based on the conditioned embeddings output from the trust conditioner. The audio representation may include a spectrogram, which may be referred as a photographic or other visual representation of a spectrum. In some implementations, the attention-based decoder may output other format of representations to represent an audio waveform, such as digital values, vectors, etc.

In some implementations, the audio representation (e.g., spectrogram) may represent a trustworthy voice, wherein some aspects corresponding to the generated spectrogram may be used to create the trust, a pitch, a tone, a sentiment, a prosody, articulation rate, a mood, an emotion, one or more filler words, a filler-word ratio, a speed (i.e., words per minute), etc.

As a non-limiting example, the attention-based decoder may include an attention layer and a decoder. The attention layer may convert the conditioned embeddings to a fixed-length context vector for each decoder output step. In some implementations, the context vector is concatenated with the output from a recursive neural network (RNN) cell of the attention layer to form the input to the decoder.

In some implementations, the vocoder may generate the output trust audio from the synthesized spectrogram as input.

Figure 3B:
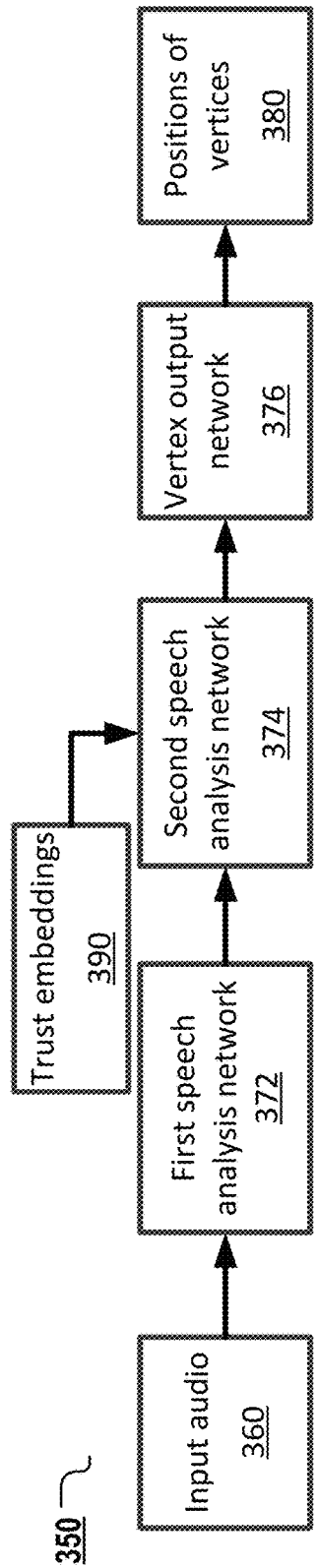
FIG. 3B shows a schematic diagram of another embodiment of the present disclosure.

FIG. 3B shows an example of a machine-learning network 350 to generate positions of vertices 380 for a face mesh according to an input audio 360 based on trust embeddings 390. The machine-learning network 350 may include a portion or all of the following: the input audio 360, a first speech analysis network 372, a second speech analysis network 374, the trust embeddings 390, a vertex output network 376, and/or the positions of vertices 380.

In some implementations, the machine-learning network 350 may be a separate network from the machine-learning network 300. The input audio may be obtained from an audio database or recorded by a recording device.

In some implementations, the machine-learning network 350 may be a part of the machine-learning network 300. The input audio 360 may be a portion or all of the trust audio 340 from FIG. 3A.

In some implementations, the machine-learning network 350 may further include a two dimensional (2D) texture generator and a three dimensional (3D) mesh generator. The positions of vertices 380 may act as 3D vertex prediction. The 2D texture generator may generate 2D texture prediction according to the positions of vertices. The 3D mesh generator may generate 3D face mesh corresponding to the input audio by coupling the 3D vertex prediction and the 3D texture prediction.

In the present disclosure, a machine-learning network (or machine-learning module) may include a set of convolution layers, a set of pooling layers, and/or a set of fully-connected layers. Artificial intelligence may be dependent on building complex machine learning models. A machine learning model may include a set of hyper-parameters. A hyper-parameter may include one or more parameter whose value is predetermined before the learning/training process may begin. Given a hyper-parameter set for a particular machine learning model, the training algorithm may learn other parameters from the training data or target data. To build a more efficient machine model with high performance, the hyper-parameter set including one or more hyper-parameters may be tuned to optimize the machine-learning network, thus improving its performance. Each set of layers in a machine learning model may include one or more hyper-parameters. For example, the set of convolution layers may include hyper-parameters about kernel size, number of channels, units per layer, padding type, etc. The set of pooling layers may include hyper-parameters for pooling type, filter size, etc. The set of fully-connected layers may include hyper-parameters for units per layer, activation type, dropout rate, etc.

Referring to FIG. 4A, a method 400 may include a portion or all of the following steps, which may be implemented partially or all on a portion or all of components described in FIGS. 1 and 2. Step 410—generate a set of trust embedding vectors based on a reference audio by a first encoder of the machine-learning network. Step 420—generate a text embedding vector based on the input text by a second encoder of the machine-learning network. Step 430—generate a conditioned vector based on the set of trust embedding vectors and the text embedding vector by a trust conditioner of the machine-learning network. Step 440—synthesize an audio representation based on the conditioned vector by an attention-based decoder of the machine-learning network. Step 450—generate the trust audio based on the synthesized audio representation by a vocoder of the machine-learning network, the trust audio being a trustworthy sound representation of the input text. In some implementations, the audio representation with inflection may include a spectrogram.

In some implementations, a system may include a non-transitory memory storing instructions executable to construct the machine-learning network to generate a trust audio corresponding to an input text. The term "construct" may include to build, to program, to train, to modify, and/or to use. The system may include a processor circuitry in communication with the non-transitory memory, wherein, the processor circuitry executes the instructions to cause the system to perform any or all of the steps in the method 400. For example, the executable instructions may build/program the machine-learning network to generate the trust audio corresponding to the input text; or the executable instructions may train the machine-learning network to generate the trust audio corresponding to the input text; or the executable instructions may use an already pre-trained machine-learning network to generate the trust audio corresponding to the input text. In some implementations, the machine-learning network may be pre-trained on a training database. The training process is described in some other parts of the present disclosure.

In some implementations, the reference audio comprises a trustworthy tone; and the first encoder comprises a trust encoder.

In some implementations, the trust encoder comprises a weight matrix and a set of trust based global style token (T-GST) tokens; and the trust encoder comprises an attention-based T-GST layer to generate the set of trust embedding vectors according to an attention-weighted summation of the T-GST tokens based on the weight matrix.

In some implementations, in response to the reference audio having a predetermined length, dynamically modifying the weight matrix according to the predetermined length of the reference audio. For example, in response to the reference audio having a length of T, the weight matrix has a size of T×128, T being a positive integer.

In some implementations, the set of embedding vectors comprises a first embedding vector for credibility, a second embedding vector for intimacy, a third embedding vector for reliability, and a fourth embedding vector for self-orientation.

Figure 5:
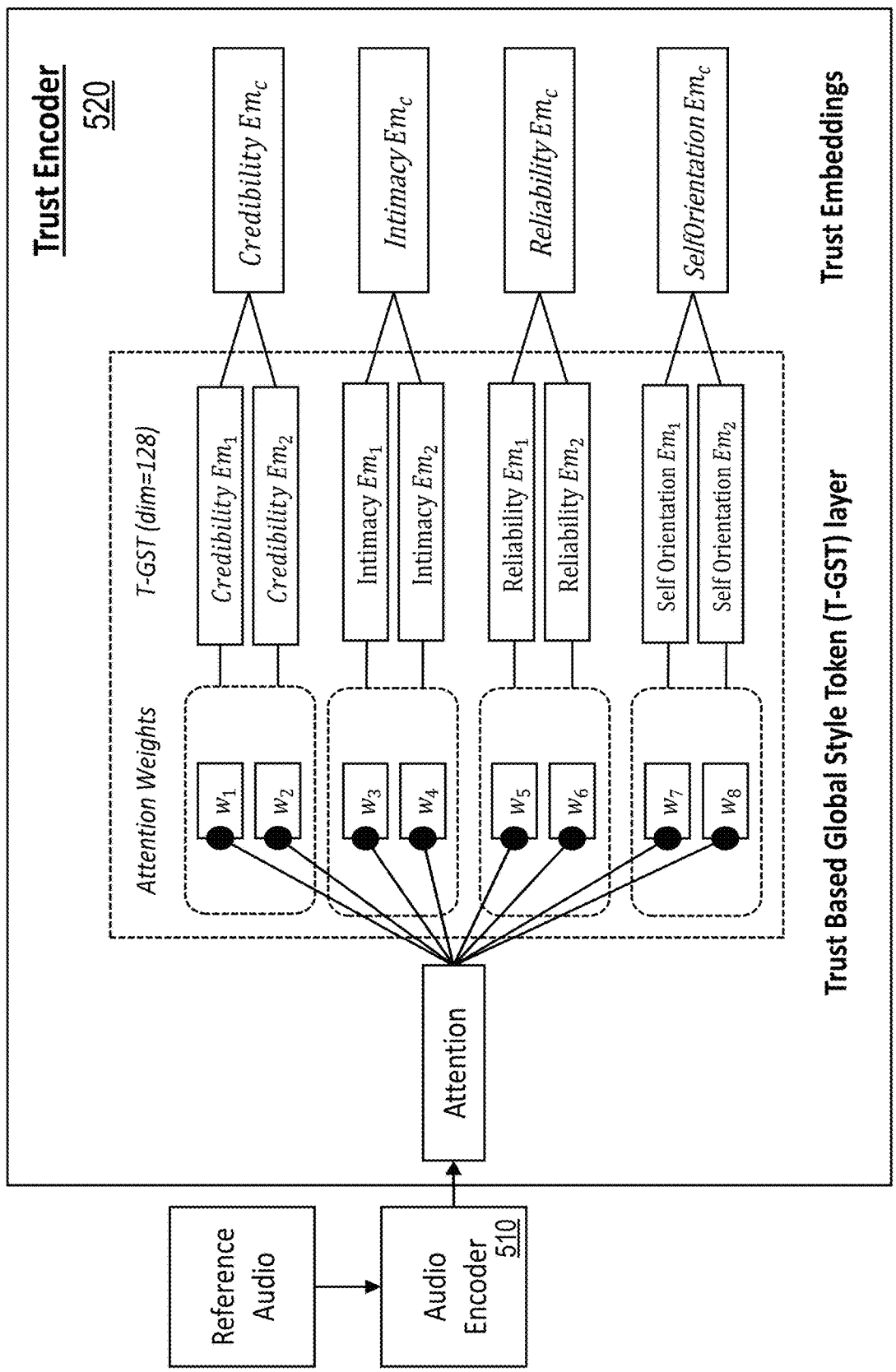
FIG. 5 shows a schematic diagram of an exemplary embodiment of the present disclosure.

In some implementations, referring to FIG. 5, the first encoder may include an audio encoder 510 and a trust encoder 520.

In some implementations, the audio encoder (also referred as a reference encoder) may encode the reference audio as one or more fixed-length vector, which may act as a query vector in the attention layer. The audio encoder (or reference encoder) may be made up of a convolutional stack, followed by an recurrent neural network (RNN). The audio encoder may take as input a log-mel spectrogram, which is first passed to a stack of 2-D convolutional layers, batch normalization and a rectified linear unit (ReLU) activation function. In some implementations, 32, 32, 64, 64, 128 and 128 output channels may be used for the 6 convolutional layers, respectively. The resulting output tensor is then shaped back to 3 dimensions (preserving the output time resolution) and fed to a single-layer 128-unit unidirectional gated recurrent unit (GRU). The last GRU state serves as the reference embedding, which is then fed as input to the style token layer. The end outputs of the process portrayed are trust embeddings for each trust component.

In some implementations, there may be four trust components for the trust embeddings, including credibility trust component, a reliability trust component, an intimacy trust component, and a self-orientation trust component. In some implementations, Charles Green trust quotient may include credibility (e.g., words; Can I trust what they say?), reliability (e.g., actions, can I trust what they do?), intimacy (e.g., emotions; Do I feel comfortable around them?), and self-orientation (e.g., motives; What do they care about?). Charles Green trust quotient may measure trust by calculating trust=(credibility+reliability+intimacy)/self-orientation. Charles Green trust quotient may be clear guidelines on evaluating trust; transparent assessment (survey on site); and/or good adoption in the market. Charles Green trust quotient may also be survey-based analysis only; questions framed against individuals, not business entities; and/or some questions not quantifiable.

In some implementations, in the T-GST Layer, 4 sets of embeddings (dim=128) may be used to learn credible, intimate, reliable, and self-oriented ways of speech, respectively. These T-GST tokens may be outputs of matrix multiplication between an encoded audio Q (of length t) and a weight matrix V. The input encoding is vertically stacked to have a dimension of 8×t, and the weight matrix V has a dimension t×128. The attention layer may generate the attention weights (w1, w2 . . . w8) by softmaxing the similarity scores between the reference audio embedding Q and each of the trust global style token. In some implementations, the attention weights may add up to 1. In some implementations, in order to force the GST layer to learn the internal trust components, the trust component prediction tasks based on the style token weights may be added together.

In some implementation, the machine-learning network may be trained iteratively according to a loss function based on a reference audio representation (e.g, a reference spectrogram). The training may be performed via backpropagation, wherein the parameters of the machine-learning network may be optimized to minimize the loss function to satisfy certain requirements.

In some implementation, the first encoder comprises a trust encoder comprising a predictor to generate a set of predicted trust scores based on the set of the trust embedding vectors.

In some implementation, the training of machine-learning network may include training the first encoder by back-propagating a mean squared error (MSE) loss, and/or training the machine-learning network iteratively according to the loss function, wherein the loss function is obtained by combining the MSE loss and a decoder loss. The MSE loss is generated based on the set of predicted trust scores and a set of trust scores corresponding to the reference audio, and the decoder loss is generated based on the synthesized spectrogram and the reference spectrogram.

In some implementation, a training dataset to train the machine-learning network comprises a first set of phonetic pangrams and a second set of trust contextual material.

Figure 6:
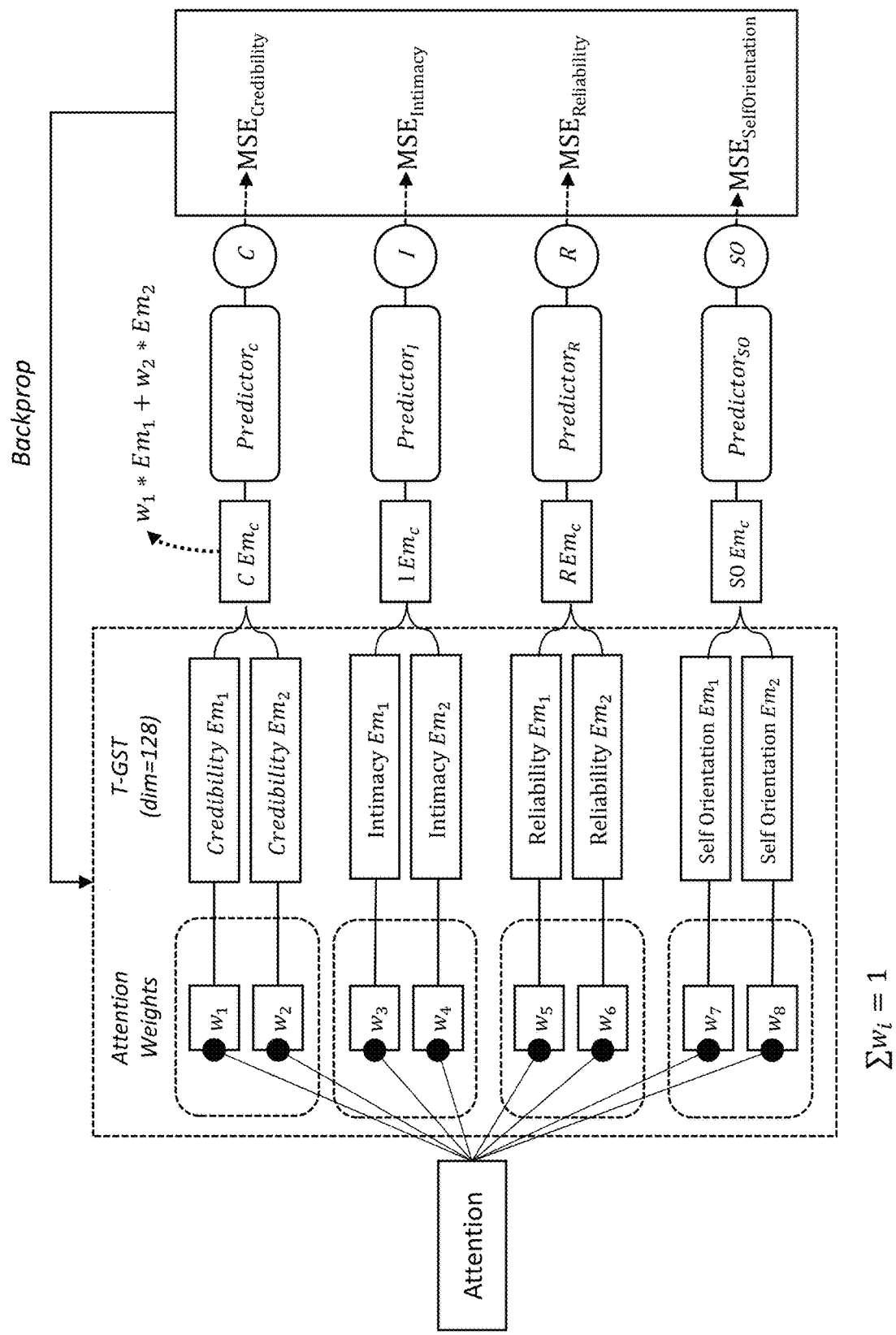
FIG. 6 shows a schematic diagram of an exemplary embodiment of the present disclosure.

In some implementations, referring to FIG. 6, the attention weighted sum of T-GSTs for each trust component (Em_c) may be the input to a set of predictors (also referred as trust predictors). The predictors may be regressors which can be as simple as a single dense layer or can be a more complex architecture. The MSE loss from each component may be backpropagated to the T-GST module to learn and adjust the weight matrix V and subsequently T-GST tokens.

Figure 7:
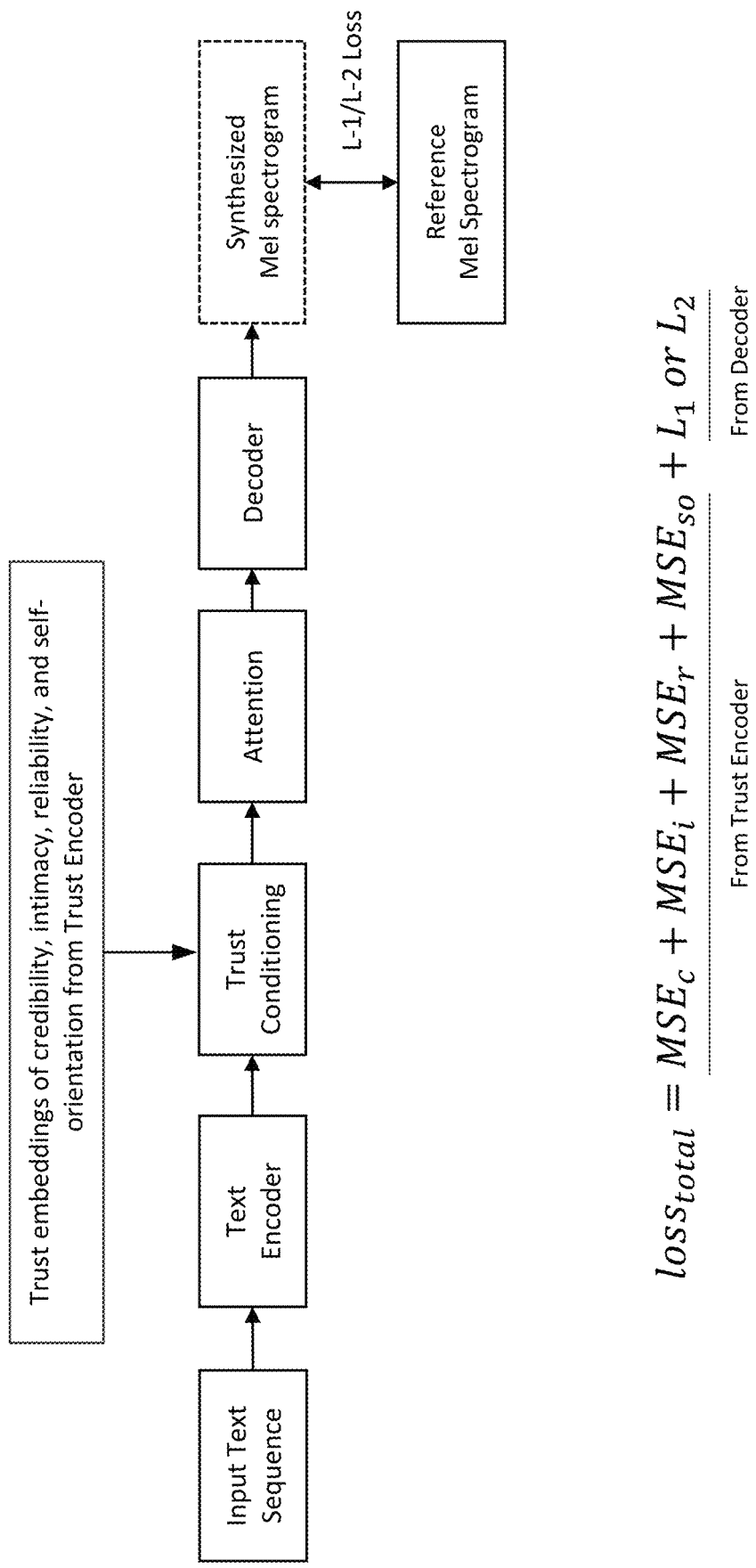
FIG. 7 shows a schematic diagram of an exemplary embodiment of the present disclosure.

In some implementations, referring to FIG. 7, a machine-learning network may include a speech synthesis portion, whose backbone may be a seq2seq model with attention. The speech synthesis portion may include an encoder, trust conditioning, an attention-based decoder (including an attention layer and a decoder). At a high-level, the speech synthesis may take characters as input and produces spectrogram frames, which are then converted to waveforms by a vocoder.

In some implementations, the text encoder may extract robust sequential representations of its input. The input to the encoder is a character (or phoneme) sequence, where each character is represented as a one-hot vector and embedded into a continuous vector. This vector is then concatenated with the trust embeddings from the trust encoder.

In some implementations, the concatenated embeddings are passed onto the attention layer where they are converted to a fixed-length context vector for each decoder output step.

In some implementations, the context vector and the attention RNN cell output may be concatenated to form the input to the decoder RNNs. A stack of GRUs with vertical residual connections may be used for the decoder. The decoder outputs the synthesized spectrogram as the target. For example, the synthesized spectrogram may be 80-band mel-scale spectrogram. The synthesized spectrogram may be compared to the reference audio's mel spectrogram to compute L-1 or L-2 loss, which are two loss functions in machine learning used to minimize the error. For example, L1 Loss function may refer to a loss function based on least absolute deviations (LAD); and/or L2 Loss function may refer to a loss function based on least square errors (LS or LSE).

In some implementations, the speech synthesis portion may be jointly trained along with the trust encoding portion according to a total loss by combining its MSE losses and the decoder's L-1 or L-2 loss.

Referring to FIG. 4B, the method 400 may further include a portion or all of the following steps, which may be implemented partially or all on a portion or all of components described in FIGS. 1 and 2. Step 460—obtain a speech feature representation based on the trust audio by a first speech analysis network of the video-generation network. Step 470—obtain an abstract feature vector based on the speech feature representation by a second speech analysis network of the video-generation network. Step 480—generate positions of vertices based on the abstract feature vector by a vertex output network of the video-generation network, the positions of vertices being used for generating the trust face mesh.

Figure 8:
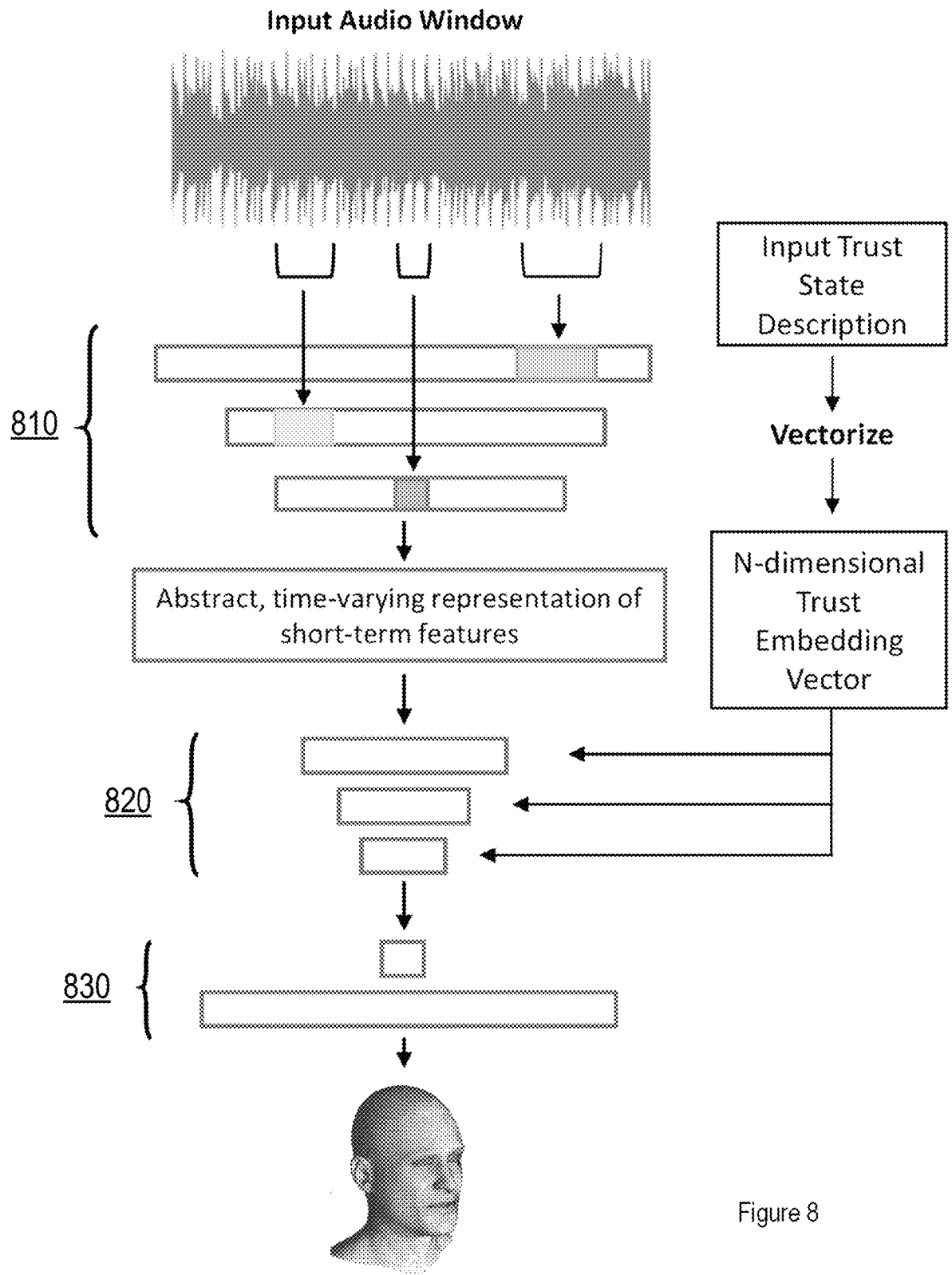
FIG. 8 shows a schematic diagram of an exemplary embodiment of the present disclosure.

In some implementations, referring to FIG. 8, the input audio window may be fed into a first speech analysis network (speech analysis network-1, 810) to produce a time-varying sequence of speech features that may subsequently drive articulation. The first speech analysis network may extract raw formant information using fixed-function autocorrelation analysis and then refine it with convolutional layers. Through training, the convolutional layers learn to extract short-term speech features that are relevant for facial animation, such as intonation, emphasis, and specific phonemes. Their abstract, time-varying representation is the output of the speech analysis network-1.

In some implementations, the result from the first speech analysis network may be fed into a second speech analysis network (speech analysis network-2, 820) that consists of further convolutional layers that analyze the temporal evolution of the speech features and eventually decide on a single abstract feature vector that describes the facial pose at the center of the audio window. As a secondary input, the speech analysis network-2 accepts a (learned) description of trust state to disambiguate between different facial expressions and speaking styles. The trust state is represented as an N-dimensional vector that may be concatenated directly onto the output of each layer in the articulation network, enabling the subsequent layers to alter their behavior accordingly.

In some implementations, the second speech analysis network may output a set of abstract features that together represent the desired facial pose, which may be used by a vertex output network (830) to produce the final 3D positions of control vertices in a tracking mesh. The vertex output network may be implemented as a pair of fully-connected layers that perform a simple linear transformation on the data. The first layer maps the set of input features to the weights of a linear basis, and the second layer calculates the final vertex positions as a weighted sum over the corresponding basis vectors.

Figure 9:
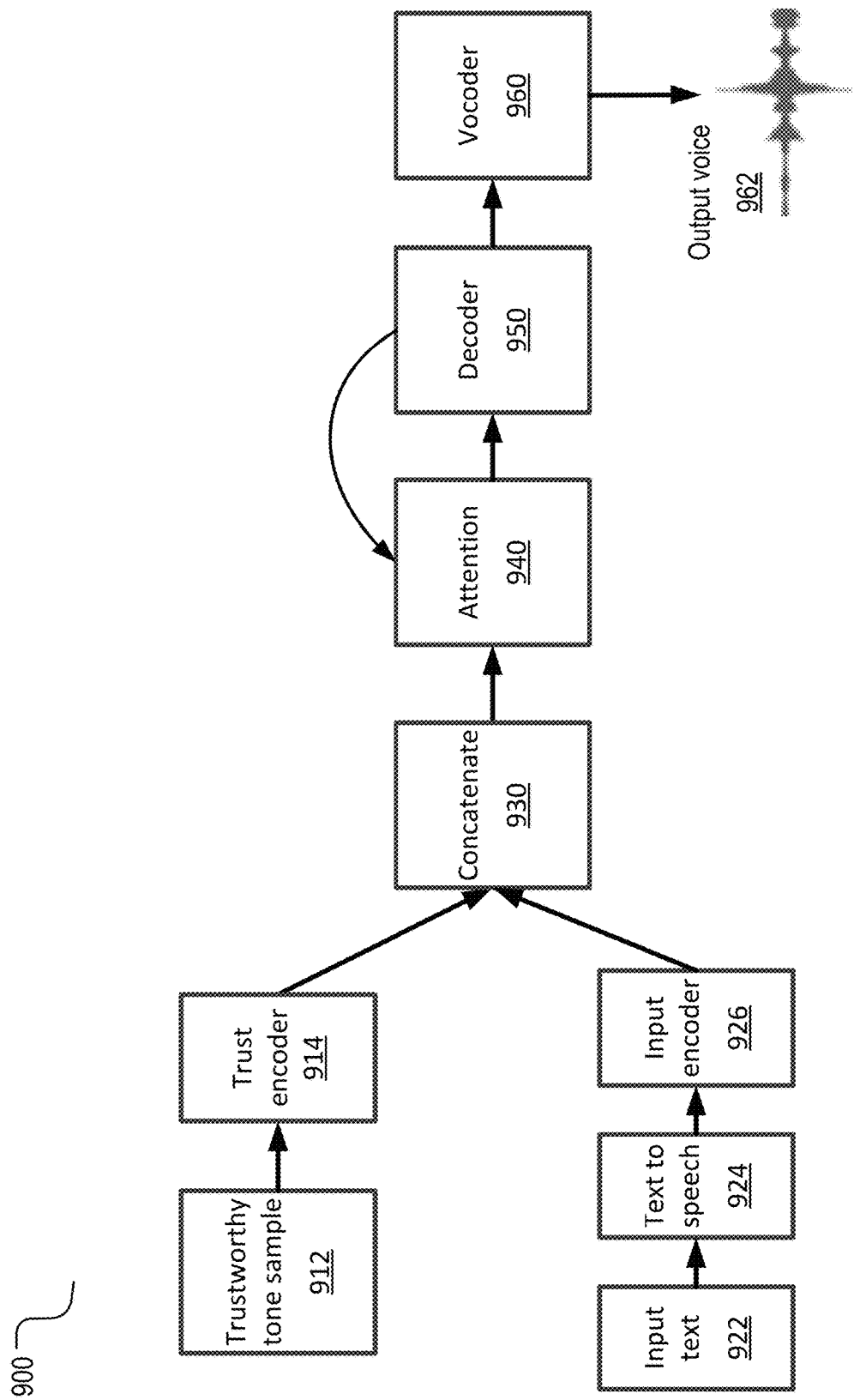
FIG. 9 shows a schematic diagram of an exemplary embodiment for an avatar voice generation of the present disclosure.

FIG. 9 shows a schematic diagram of an exemplary embodiment of an avatar voice generation system 900 for generating a trustworthy voice 962 based on an input text 922 and a reference trustworthy tone sample 912. The system 900 may include a portion or all of the following: a trust encoder 914, a text to speech module 924, an input encoder 926, a concatenate module 930, an attention layer 940, a decoder 950, and/or a vocoder 960. In some implementations, a sequence of phonemes and Mel spectrogram of applying text to speech are collected on input text. The spectrogram is passed to the input encoder to generate an input embedding. The trust encoder encodes the reference tone sample and concatenates with input encoding. A new Mel spectrogram is generated by a decoder 950 with attention 940. This attention network 940 is built to be location-sensitive by using cumulative attention weights from previous decoder time steps as an additional feature. Attention probabilities are computed after projecting inputs and location features to low-dimensional hidden representations. Location features are computed using 1-D convolution filters. The decoder 950 is an autoregressive recurrent neural network which predicts a Mel spectrogram from the encoded input sequence one frame at a time. The output voice is generated by a vocoder on the Mel spectrogram.

Figure 10:
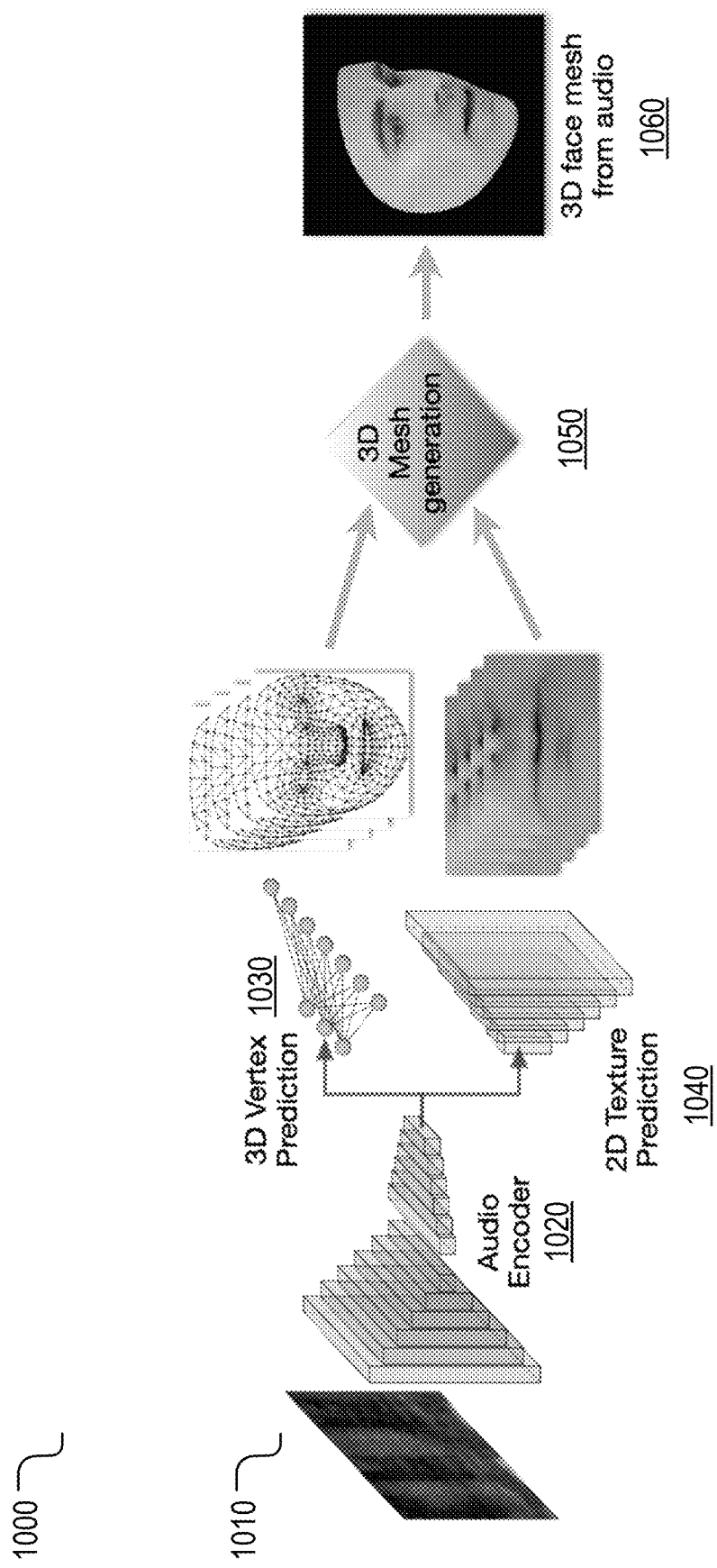
FIG. 10 shows a schematic diagram of an exemplary embodiment for an avatar face mesh generation of the present disclosure.

FIG. 10 shows a schematic diagram of an exemplary embodiment of an avatar face generation system 1000 for generating a three-dimension (3D) face mesh 1060 based on an input audio 1010. In some implementations, the input audio 1010 may be the trustworthy voice 962 in FIG. 9. The system 1000 may include a portion or all of the following: an audio encoder 1020, a 3D vertex prediction 1030, a 2D texture prediction 1040, and/or a 3D mesh generator 1050.

The avatar face generation system may predict geometry and texture from audio input. It extracts the audio channel from the training video and transforms into Mel spectrograms as an input. The training outputs are generated by a 3D face landmark detector with fixed topology. The predicted vertices may be projected onto the reference cylinder, and use the resulting 2D locations as texture coordinates to convert it to a textured 3D mesh. Since the predicted texture atlas is defined on the same cylindrical domain, it is consistent with the computed texture coordinates. The result of the avatar face generation system 1000 is a fully textured 3D face mesh, driven by audio input.

Figure 11:
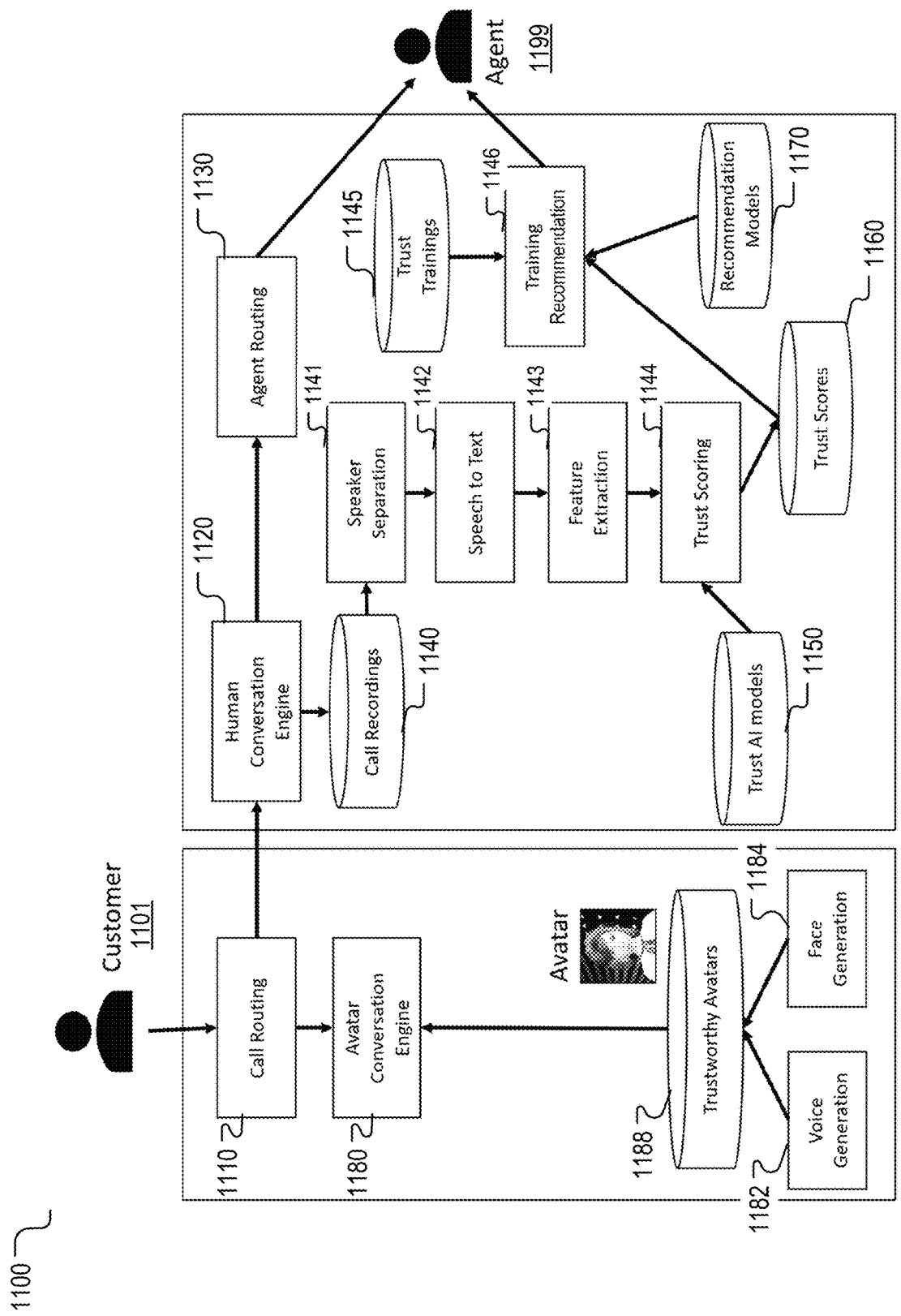
FIG. 11 shows a schematic diagram of an exemplary embodiment of the present disclosure.

FIG. 11 shows a schematic diagram of an exemplary embodiment of an overall system 1100 for providing an objective, reproducible, and/or automated way for trust management in conversations. In some implementations, the system 1100 may be used in a call center to answer inquiries from one or more customer 1101 by one or more agent 1199. The trust of call center's agents may need improvement, and/or the digital avatar 1188 may be implemented to perform some of the work of the call center's agents. The system 1100 may include a portion or all of the following: a call routing module 1110, an avatar conversation engine 1180, one or more trustworthy avatars 1188, a voice generation module 1182, a face generation module 1184, a human conversation engine 1120, an agent routing module 1130, a call recording module 1140, a speaker separation module 1141, a speech to text module 1142, a feature extraction module 1143, a trust scoring module 1144, a rust training module 1145, a training recommendation 1146, one or more trust AI model 1150, a trust score storage 1160, and/or one or more recommendation model 1170.

In some implementations, when a customer 1101 contacts a call center, the call routing module 1110 may determine whether to have the customer connecting with a human conversation engine 1120 or an avatar conversation engine 1180.

When the call routing module determines the customer to connect with a human conversation engine, the customer may have conversation with a determined agent 1199 after the agent routing module 1130 determines which agent to have conversation with the customer. The human conversation engine may send the conversation to call recording module for recording, and the recording or the live conversation may be processed to obtain a trust scores and/or be processed to generate a recommendation for improvement.

When the call routing module determines the customer to connect with an avatar conversation engine, the customer may have conversation with a trustworthy avatar 1188. The avatar 1188 may be an avatar with voice capability only, or may be an avatar with both voice and facial expression capability. The avatar 1188 may include a voice generation module 1182 to generate voice based on auto-generated text and a reference trustworthy tone sample, and/or a face generation module 1184 to generate 3D face mesh based on the generated voice.

In some implementations, during training the machine-learning network, a training dataset may include one or two parts of the following: phonetic pangrams and contextual material. Phonetic pangrams are sentences that utilizes all phonemes in a given language. A set of phonetic pangram sentences are obtained, slight changes are made so that the sentences are contextually rational for day-to-day conversation, while ensuring that the set as a whole covers all the possible phonemes in the target language. An actor speaks to the phonetic pangrams set with three different speeds (slow, normal, fast), to cover phonetic details such as paragoge, nasal ending, and linking sounds. For obtaining trust contextual material, several trust-related conversational contexts and character backgrounds are designed. The conversational contexts can include a situation where an actor have to lie, or where the actor have to tell the truth, etc. The character backgrounds include an experienced liar, or a resolute and scrupulous, etc.

In some implementations, referring to FIG. 12A, a method 1210 for generating the training set may include utilizing 3D recording devices such as Kinect to record 3D videos of actors speaking to the designed scripts. For example, the method may include setting up a recording environment to collect data from call center agents.

In some implementations, referring to FIG. 12B, another method 1220 for generating the training set may include utilizing existing video data (for example, some open-source video data). The method may include scoring existing videos (e.g., open-source videos) by a trust scoring model, generating a balanced training set by selecting videos with a range of trust scores (e.g., high trust score videos and low score videos). A semi-supervised training process may be achieved by taking this approach. In some implementations, existing videos are largely in 2D, and the output layer of the mesh prediction model may be modified to generate 2D control vertices instead of 3D control vertices. The 2D control vertices can then be used to drive a static image to generate 2D videos.

In some implementations, depending on the application, one or both of the two training methods may be selected and either a 2D avatar or a 3D avatar may be trained according to certain requirements.

In the present disclosure, some figures may show a schematic representation of a neural network, which serves as an illustrative representation and does not impose limitations to the neural network. For example, the neural network may include one or more AI machine learning techniques/networks, including but not limited to, a k-means, a term frequency-inverse document frequency (TF-IDF), a random forest, a deep neural network (DNN), and/or a recurrent neural network (RNN). For another example, the architecture of the neural network is not limited to the representation shown in the figures, for example, the sequence/order of various layers and/or a number of types of layers (e.g., convolutional layers, pooling layers, fully-connected layers, etc.).

In the present disclosure, when applicable, an entire system or one or more component/module of the system may include one or more AI machine learning techniques/networks, including but not limited to, a k-means, a term frequency-inverse document frequency (TF-IDF), a random forest, a deep neural network (DNN), and/or a recurrent neural network (RNN).

In the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processor circuitry (or processor circuitry and memory). Likewise, a processor circuitry (or processor circuitry and memory) can be used to implement one or more modules. Moreover, each module can be part of an overall module that includes the functionalities of the module. The description here also applies to the term module and other equivalent terms.

In the present disclosure, an entire system or one or more component of the system may include one or more software unit, one or more hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processor circuitry (or processor circuitry and memory). Likewise, a processor circuitry (or processor circuitry and memory) can be used to implement one or more units. Moreover, each unit can be part of an overall unit that includes the functionalities of the unit. The description here also applies to the term unit and other equivalent terms.

The methods, devices, processing, and logic described above may be implemented in many different ways and in many different combinations of hardware and software. For example, all or parts of the implementations may be circuitry that includes an instruction processor circuitry, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a random access memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processor circuitries and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processor circuitries, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system comprising:
a non-transitory memory storing instructions executable to construct a machine learning network to generate a trust audio corresponding to an input text; and
a processor circuitry in communication with the non-transitory memory, wherein, the processor circuitry executes the instructions to cause the system to:
generate a set of trust embedding vectors based on a reference audio by a first encoder of the machine-learning network;
generate a text embedding vector based on the input text by a second encoder of the machine-learning network;
generate a conditioned vector based on the set of trust embedding vectors and the text embedding vector by a trust conditioner of the machine-learning network;
synthesize an audio representation based on the conditioned vector by an attention-based decoder of the machine-learning network; and
generate the trust audio based on the synthesized audio representation by a vocoder of the machine-learning network, the trust audio being a trustworthy sound representation of the input text, wherein:
the machine-learning network comprises a video-generation network to generate a trust face mesh corresponding to the trust audio; and
the processor circuitry executes the instructions to further cause the system to:
obtain a speech feature representation based on the trust audio by a first speech analysis network of the video-generation network:
obtain an abstract feature vector based on the speech feature representation by a second speech analysis network of the video-generation network; and
generate positions of vertices based on the abstract feature vector by a vertex output network of the video-generation network, the positions of vertices being used for generating the trust face mesh.

2. The system according to claim 1, wherein:
the second speech analysis network comprises a plurality of convolutional layers;
each layer of the plurality of convolutional layers in the second speech analysis network receives the set of trust embedding vectors as input; and
the vertex output network comprises a first fully-connected layer and a second fully-connected layer.

3. The system according to claim 1, wherein:
the reference audio comprises a trustworthy tone; and
the first encoder comprises a trust encoder.

4. The system according to claim 3, wherein:
the trust encoder comprises a weight matrix and a set of trust based global style token (T-GST) tokens; and
the trust encoder comprises an attention-based T-GST layer to generate the set of trust embedding vectors according to an attention-weighted summation of the T-GST tokens based on the weight matrix.

5. The system according to claim 4, wherein:
in response to the reference audio having a predetermined length, dynamically modifying the weight matrix according to the predetermined length of the reference audio.

6. The system according to claim 1, wherein:
the set of trust embedding vectors comprises a first embedding vector for credibility, a second embedding vector for intimacy, a third embedding vector for reliability, and a fourth embedding vector for self-orientation.

7. The system according to claim 1, wherein the processor circuitry executes the instructions to further cause the system to:
pre-train the machine-learning network iteratively according to a loss function based on a reference audio representation.

8. The system according to claim 7, wherein:
the first encoder comprises a trust encoder comprising a predictor to generate a set of predicted trust scores based on the set of trust embedding vectors; and
the instructions to cause the system to train the machine-learning network iteratively according to the loss function comprises instructions to cause the system to:
train the first encoder by backpropagating a mean squared error (MSE) loss, and
train the machine-learning network iteratively according to the loss function, wherein the loss function is obtained by combining the MSE loss and a decoder loss, wherein:
the MSE loss is generated based on the set of predicted trust scores and a set of trust scores corresponding to the reference audio, and
the decoder loss is generated based on the synthesized audio representation and the reference audio representation.

9. The system according to claim 7, wherein:
a training dataset to train the machine-learning network comprises a first set of phonetic pangrams and a second set of trust contextual material.

10. A method comprising:
generating, by a computer device, a set of trust embedding vectors based on a reference audio by a first encoder of a machine-learning network;
generating, by the computer device, a text embedding vector based on an input text by a second encoder of the machine-learning network;
generating, by the computer device, a conditioned vector based on the set of trust embedding vectors and the text embedding vector by a trust conditioner of the machine-learning network;
synthesizing, by the computer device, an audio representation based on the conditioned vector by an attention-based decoder of the machine-learning network; and
generating, by the computer device, the trust audio based on the synthesized audio representation by a vocoder of the machine-learning network, the trust audio being a trustworthy sound representation of the input text,
wherein:
the machine-learning network comprises a video-generation network to generate a trust face mesh corresponding to the trust audio; and
the method further comprises:
obtaining a feature representation based on the trust audio by a first speech analysis network of the video-generation network;
obtaining an abstract feature vector based on the feature representation by a second speech analysis network of the video-generation network; and
generating positions of vertices based on the abstract feature vector by a vertex output network of the video-generation network, the positions of vertices being used for generating the trust face mesh.

11. The method according to claim 10, wherein:
the second speech analysis network comprises a plurality of convolutional layers;
each layer of the plurality of convolutional layers in the second speech analysis network receives the set of trust embedding vectors as input; and
the vertex output network comprises a first fully-connected layer and a second fully-connected layer.

12. The method according to claim 10, wherein:
the first encoder comprises a trust encoder comprising a weight matrix and a set of trust based global style token (T-GST) tokens; and
the trust encoder comprises an attention-based T-GST layer to generate the set of trust embedding vectors according to an attention-weighted summation of the T-GST tokens based on the weight matrix.

13. The method according to claim 10, further comprising:
pre-training the machine-learning network iteratively according to a loss function based on a reference audio representation.

14. A product comprising:
machine-readable media other than a transitory signal;
instructions stored on the machine-readable media for constructing a machine learning network to generate a trust audio corresponding to an input text; and
wherein when a processor circuitry executes the instructions, the product is configured to:
generate a set of trust embedding vectors based on a reference audio by a first encoder of the machine-learning network;
generate a text embedding vector based on the input text by a second encoder of the machine-learning network;
generate a conditioned vector based on the set of trust embedding vectors and the text embedding vector by a trust conditioner of the machine-learning network;
synthesize an audio representation based on the conditioned vector by an attention-based decoder of the machine-learning network; and
generate the trust audio based on the synthesized audio representation by a vocoder of the machine-learning network, the trust audio being a trustworthy sound representation of the input text, wherein:
the machine-learning network comprises a video-generation network to generate a trust face mesh corresponding to the input text; and
when the processor circuitry executes the instructions, the product is further configured to:

obtain a feature representation based on the trust audio by a first speech analysis network of the video-generation network;

obtain an abstract feature vector based on the feature representation by a second speech analysis network of the video-generation network; and generate positions of vertices based on the abstract feature vector by a vertex output network of the video-generation network, the positions of vertices being used for generating the trust face mesh.

15. The product according to claim 14, wherein:

the second speech analysis network comprises a plurality of convolutional layers;

each layer of the plurality of convolutional layers in the second speech analysis network receives the set of trust embedding vectors as input; and the vertex output network comprises a first fully-connected layer and a second fully-connected layer.

16. The product according to claim 14, wherein:

the first encoder comprises a trust encoder comprising a weight matrix and a set of trust based global style token (T-GST) tokens; and the trust encoder comprises an attention-based T-GST layer to generate the set of trust embedding vectors according to an attention-weighted summation of the T-GST tokens based on the weight matrix.

17. The product according to claim 14, wherein, when the processor circuitry executes the instructions, the product is further configured to:

pre-train the machine-learning network iteratively according to a loss function based on a reference audio representation.

* * * * *